2,921,089
2-PROPYLHEPTANOL AND ITS ESTERS

Hugh J. Hagemeyer, Jr., Longview, Tex., and Milton A. Perry, Kingsport, Tenn., assignors to Eastman Kodak Company, Rochester, N.Y., a corporation of New Jersey No Drawing. Application November 27, 1957
Serial No. 699,167

3 Claims. (Cl. 260—475)

This invention relates to a new alcohol and to its esters with dicarboxylic acids.

Our novel alcohol is 2-propyl-heptanol,

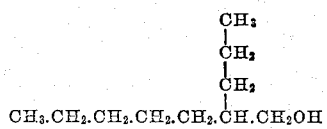

We have prepared this alcohol by subjecting n-valeraldehyde to aldol condensation, with dehydration of the resulting aldol to 2-propyl-2-heptenal, followed by hydrogenation in two stages, to give successively 2-propyl heptanal and 2-propyl-heptanol, or in a single stage to give 2-propyl-heptanol directly.

The dehydrated aldol product of n-valeraldehyde, namely 2-propyl-2-heptenal, is produced by feeding a solution of n-valeraldehyde to a hot solution of an alkaline catalyst. Although the concentration of alkali used is not critical, it is preferred to use 2–10% sodium or potassium hydroxide solution. Alkali cyanides may also be used as catalysts. The ratio by volume of water layer to organic layer in the aldol reactor can vary within wide limits. As much as 95% water layer to 5% organic layer may be used, or as little as 30% water layer to 70% organic layer. Reaction temperatures varying from 50° C. to 150° C. have been used; we have found that optimum results are usually obtained in the temperature range of 90–110° C. or at the boiling point of the caustic solution. By operating in the preferred temperature range and using strongly alkaline catalyst solutions, high yields of 2-propyl-2-heptenal can be obtained. We have also found it advantageous to hold the salt concentration in the aldol reactor below 10% calculated as sodium valerate, and we prefer to operate at salt concentrations below 5%. Higher salt concentrations increase the solubility of the organic reactants in the water layer, and thus actually catalyze the formation of additional salts, thereby reducing the yield of the desired product.

Example 1—Preparation of 2-propyl-2-heptenal.—Two hundred grams of 5% aqueous sodium hydroxide was brought to vigorous reflux. 810 g. of n-valeraldehyde was added dropwise, over a period of one hour, at reflux temperatures, with vigorous stirring. The organic layer was separated, and distilled from 2% sodium hydroxide solution. The product was dried on a Dean-Stark trap, and purified by distillation through a 30-plate column at 4:1 reflux, to give 560 g. of 2-propyl-2-heptenal, boiling at 208–209° C. 2-propyl-2-heptenal azeotropes at 97.5° C. with 80% water. The organic layer contained 0.82% water, and the water layer contained 1.7% organic.

Example 2—Preparation of 2-propyl-2-heptenal.— Eight thousand six hundred grams of n-valeraldehyde was fed to a small continuous aldol reaction system with a 1-liter holdup. An organic-to-water ratio of 70:30 was maintained; the water layer averaged 2% caustic and less than 5% salts calculated as sodium valerate. The n-valeraldehyde was fed through the system in approximately 8 hours, the reaction temperature being maintained at 93–97° C. The product overflowed continuously through a decanter, and the organic layer was distilled from 2% caustic solution on a 30-plate column. A 97% yield of 2-propylheptenal azeotroping at 97.5° C. was obtained.

Example 3—Preparation of 2-propyl heptenal.—Five hundred grams of 2-propyl-2-heptenal prepared in Example 2 was hydrogenated with 5% Raney nickel and 5% water in an autoclave at 90° C. until the unsaturation had been reduced to 6% calculated as 2-propyl-2-heptenal. The product was removed from the autoclave and decanted from the catalyst, washed with water, and filtered through Filter-Cel (a form of diatomaceous earth, sold by the Johns-Manville Sales Corp.). The crude product was dried on a Dean-Stark trap and distilled on a 100-plate column. An 81% yield of 2-propyl-heptenal, boiling point 199° C., was obtained.

Example 4—Preparation of 2-propyl-heptanol.—One liter of 2-propyl-2-heptenal prepared in Example 2 was hydrogenated with 5% Raney nickel and 5% water in a stainless steel autoclave at 165° C. and 300 p.s.i. The hydrogenation was substantially complete in 2 hours with a residual carbonyl of less than 0.1% as 2-propyl-2-heptenal. The crude product was discharged from the autoclave, decanted from the catalyst, washed with water and filtered through Filter-Cel. The alcohol was dried and distilled on a 30-plate column at 5:1 reflux. A 96% yield of 2-propyl-heptanol, boiling at 215° C. at 760 mm., was obtained.

The di-esters of 2-propyl-heptanol with dicarboxylic acids containng only carbon, hydrogen and oxygen atoms have particularly valuable properties as plasticizers for vinyl resins and cellulose esters. In particular, they impart to these plastics, improved retention of flexibility at extremely low temperatures: a property which is of steadily increasing importance. They also have exceptional properties as synthetic lubricants. These esters may be prepared by conventional methods from 2-propyl heptanol and the appropriate acid or acid anhydride.

Example 5—Preparation of di-(2-propylheptyl) phthalate.—Four hundred grams of 2-propyl-heptanol, 148 g. of phthalic anhydride, 0.05 ml. of sulfuric acid and 100 ml. of toluene were heated to reflux in a round-bottom flask equipped with a Dean-Stark trap. The theoretical quantity of water was removed rapidly. After the toluene and excess alcohol had been distilled off, the di-(2-propylheptyl) phthalate remaining had an APHA color of 35. It distilled at 178° C. at a pressure of 0.15 mm. Hg.

Using the same and similar conventional esterification procedures, the following 2-propylheptanol esters of dicarboxylic acids were prepared:

| Ester | Boiling Point |
| --- | --- |
| Di-(2-propylheptyl) sebacate | 205–210° C. at 0.07 mm. Hg. |
| Di-(2-propylheptyl) azelate | 190–192° C. at 0.25 mm. Hg. |
| Di-(2-propylheptyl) adipate | 178–182° C. at 0.25 mm. Hg. |

The following table shows the properties of a plastic made by compounding 100 parts by weight of Geon 101 with 50 parts by weight of various phthalate plasticizers. Geon 101 is a polyvinyl chloride copolymer containing over 95% of polyvinyl chloride, manufactured by The B. F. Goodrich Chemical Co. The ASTM designations according to which the properties were tested are to be found in Part 6 of ASTM Standards, 1955, published by the American Society for Testing Materials. The plasticizers tested are di-(2-propylheptyl) phthalate, three other di-decyl phthalates, and, as a standard plasticizer, di-(2-ethyl-hexyl) phthalate.

In the table, the line "135,000 p.s.i. mod., ° C." shows the temperatures at which the apparent modulus of rigidity is 135,000 pounds per square inch. It will be noted that for di-(2-propylheptyl) phthalate this temperature is 8 degrees lower than for di-(2-ethyl-hexyl) phthalate or for commercial di-decyl phthalate, and 12 degrees lower than for di-(2-isopropyl 5-methylhexyl) phthalate. It will also be noted that substitution of di-(2-propyl-4-methyl-hexyl) phthalate for 30% of the di-(2-propylheptyl) phthalate raises this temperature 2° C. Hence it is clear that di-(2-propylheptyl) phthalate is an extremely valuable plasticizer for polyvinyl chloride compositions which are to be used at very low temperatures.

*Properties of Geon 101 plasticized with various phthalates*

| Property | ASTM Designation | Di-(2-propylheptyl) Phthalate | Di-(2-ethylhexyl) Phthalate | Di-(2-isopropyl 5-methyl-hexyl) Phthalate | Mixed Di-Decyl Phthalates [1] | Commercial Di-Decyl Phthalate |
|---|---|---|---|---|---|---|
| Tensile strength, p.s.i. | D882-54T | 2700 | 3000 | 2800 | 2750 | 2850 |
| Elongation, percent | D882-54T | 360 | 330 | 350 | 375 | 340 |
| Tear resistance | D1004-49T | 420 | 330 | 500 | 430 | 370 |
| Durometer hardness | D314-52T | 90 | 84 | 96 | 92 | 88 |
| 135,000 p.s.i. mod., ° C | D1043-51 | −52 | −44 | −40 | −50 | −44 |
| Soapy water extraction (loss) | D1239-55 | 0.1 | 0.1 | 0.1 | | 0.1 |
| Heptane extraction (loss) | D1239-55 | 29 | 22 | 25 | | 27 |
| Activated carbon (loss) | D1203-55 | 0.3 | 1.5 | 0.8 | 0.6 | 0.6 |
| Retained elongation (oven test—1 week at 120° C.) | D882-54T | 84 | 49 | 0 | 78 | 73 |

[1] 70% di-(2-propylheptyl) phthalate and 30% di-(2-propyl-4-methyl-hexyl) phthalate.

What we claim as our invention and desire to be secured by Letters Patent of the United States is:

1. The di-(2-propylheptyl) ester of a dicarboxylic acid selected from the group consisting of phthalic acid and adipic acid.
2. Di-(2-propylheptyl) phthalate.
3. Di-(2-propylheptyl) adipate.

References Cited in the file of this patent

UNITED STATES PATENTS

| | | |
|---|---|---|
| 1,993,737 | Graves et al. | Mar. 12, 1935 |
| 2,014,310 | Carruthers | Sept. 10, 1935 |
| 2,780,643 | Buchner | Feb. 5, 1957 |

OTHER REFERENCES

Pratt et al.: J. Am. Chem. Soc. 76, 55 (1954).